US012650760B2

(12) United States Patent
Donskoy et al.

(10) Patent No.: US 12,650,760 B2
(45) Date of Patent: Jun. 9, 2026

(54) METAVERSE EVENT SEQUENCING

(71) Applicant: Roblox Corporation, San Mateo, CA (US)

(72) Inventors: Filip Donskoy, San Mateo, CA (US); Joseph Reese, San Mateo, CA (US); Luke Weber, San Mateo, CA (US); Joshua Martheze, San Mateo, CA (US); Kip Turner, San Mateo, CA (US); Morgan Tucker, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 177 days.

(21) Appl. No.: 18/345,043

(22) Filed: Jun. 30, 2023

(65) Prior Publication Data

US 2024/0004529 A1 Jan. 4, 2024

Related U.S. Application Data

(60) Provisional application No. 63/357,373, filed on Jun. 30, 2022.

(51) Int. Cl.
*G06F 3/048* (2013.01)
*G06F 3/0484* (2022.01)

(52) U.S. Cl.
CPC .................................. *G06F 3/0484* (2013.01)

(58) Field of Classification Search
CPC .................................................... G06F 3/0484
See application file for complete search history.

(56) References Cited

U.S. PATENT DOCUMENTS

| | | | |
|---|---|---|---|
| 8,930,841 B2 * | 1/2015 | Huang ................ | G06F 3/04842 |
| | | | 715/764 |
| 8,963,847 B2 * | 2/2015 | Hunt ..................... | G06F 3/0484 |
| | | | 345/173 |
| 9,311,965 B2 * | 4/2016 | Hwang ................ | G06F 3/0488 |
| 10,701,434 B1 * | 6/2020 | Jindal .............. | H04N 21/23418 |
| 2009/0153389 A1 * | 6/2009 | Kerr ..................... | G06F 3/04855 |
| | | | 386/243 |

(Continued)

OTHER PUBLICATIONS

Xiong et al., Storyline Representation of Egocentric Videos with an Application to Story-based Search; 2015, IEEE, 9 pages. (Year: 2015).*

*Primary Examiner* — Linh K Pham
(74) *Attorney, Agent, or Firm* — IP Spring

(57) ABSTRACT

Implementations described herein relate to methods, systems, and computer-readable media for metaverse event sequencing. A method may include receiving a request to cue a scene associated with a metaverse place from a user device, the scene associated with a master timeline of events, wherein each event of the master timeline of events is associated with a respective time point on the master timeline, and wherein the request includes a first cue point. The method may also include retrieving scene data associated with the scene, identifying a set of events with time points that are at or after the first cue point, transitioning the master timeline to the first cue point, recreating the set of events based upon a current point in the master timeline after the transitioning and in a sequence based on the master timeline, and providing the recreated events for display at the user device.

20 Claims, 6 Drawing Sheets

(56)         References Cited

U.S. PATENT DOCUMENTS

| | | | |
|---|---|---|---|
| 2009/0153478 A1* | 6/2009 | Kerr | H04N 5/445 |
| | | | 345/184 |
| 2009/0287790 A1* | 11/2009 | Upton | H04N 7/17318 |
| | | | 709/208 |
| 2011/0296476 A1* | 12/2011 | Rouse | H04N 21/251 |
| | | | 725/109 |
| 2013/0322848 A1* | 12/2013 | Li | H04N 5/783 |
| | | | 386/E5.003 |
| 2014/0186010 A1* | 7/2014 | Guckenberger | G11B 27/11 |
| | | | 386/248 |
| 2014/0258854 A1* | 9/2014 | Li | H04N 21/414 |
| | | | 715/702 |
| 2014/0282262 A1* | 9/2014 | Gregotski | H04N 21/8549 |
| | | | 715/838 |
| 2017/0046058 A1* | 2/2017 | Karunamuni | G06F 3/04812 |
| 2019/0306486 A1* | 10/2019 | Nakajima | H04N 13/189 |
| 2020/0097731 A1* | 3/2020 | Gupta | H04N 21/4667 |
| 2020/0250792 A1* | 8/2020 | Uno | H04N 9/77 |
| 2022/0070232 A1* | 3/2022 | Young | G06T 19/003 |
| 2022/0269385 A1* | 8/2022 | Chundi | G06F 3/0488 |
| 2022/0353101 A1* | 11/2022 | Hu | H04L 12/1822 |
| 2023/0152961 A1* | 5/2023 | Perea-Ochoa | G06F 3/014 |
| | | | 715/764 |
| 2023/0188795 A1* | 6/2023 | Oguchi | H04N 21/47217 |
| | | | 715/720 |
| 2023/0315605 A1* | 10/2023 | Leland | G06F 11/3438 |
| | | | 709/224 |
| 2023/0376189 A1* | 11/2023 | Bove, Jr. | G11B 27/34 |

* cited by examiner

Figure 1:
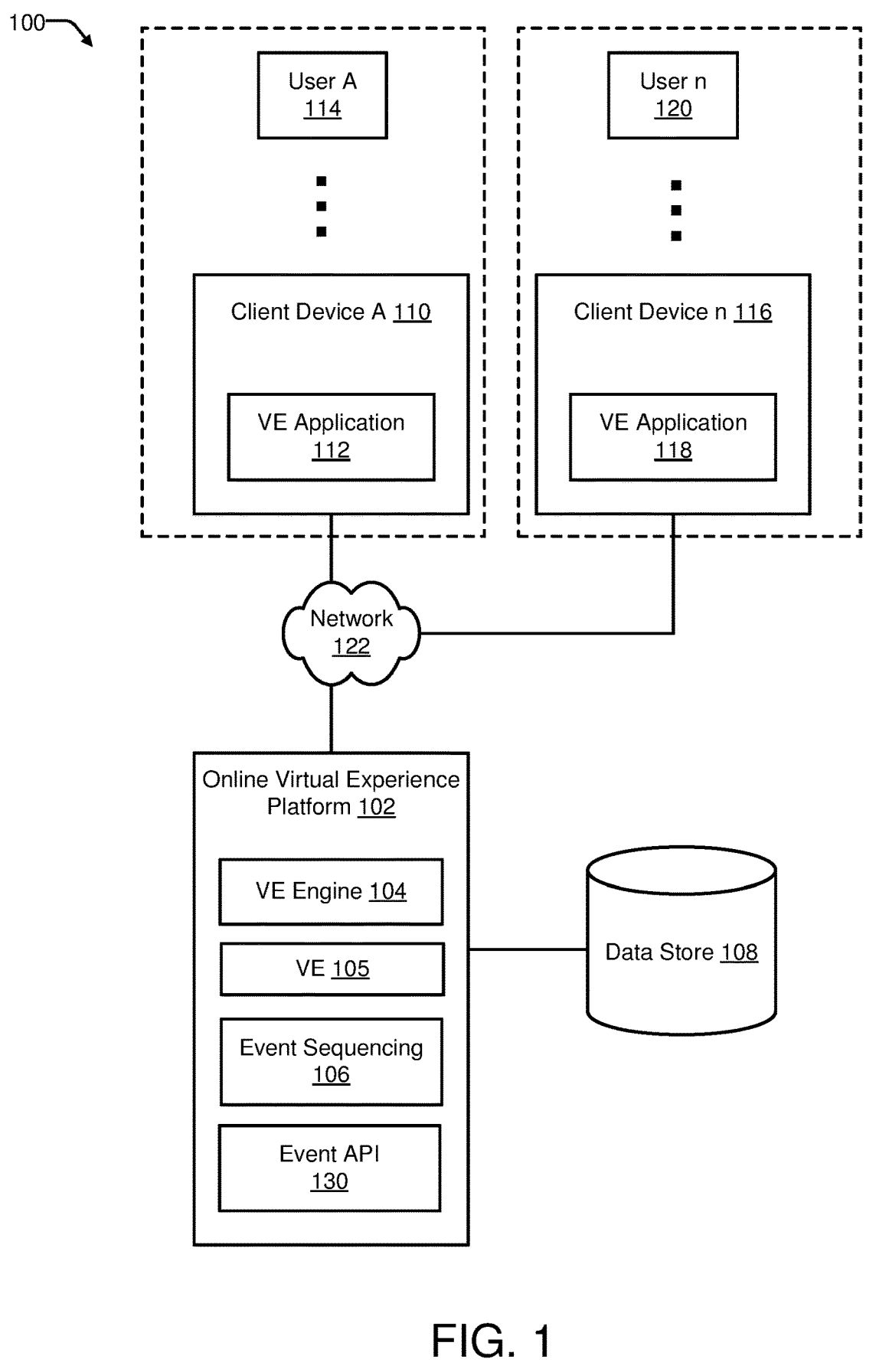

100

User A
114

User n
120

Client Device A 110

VE Application
112

Client Device n 116

VE Application
118

Network
122

Online Virtual Experience
Platform 102

VE Engine 104

VE 105

Event Sequencing
106

Event API
130

Data Store 108

Online Virtual Experience Platform 102

Scene Switcher 202

Conductor 204

Orchestration 206

Network 122

Data Store 108

Client Device A 110

Client Device n 116

METAVERSE EVENT SEQUENCING

CROSS-REFERENCE TO RELATED APPLICATIONS

The present application claims the benefit of priority to U.S. Provisional Patent Application No. 63/357,373, filed Jun. 30, 2022 and entitled METAVERSE EVENT SEQUENCING, the entire contents of which are hereby incorporated by reference herein.

TECHNICAL FIELD

Embodiments relate generally to virtual experiences rendered via a computer device, and more particularly, to methods, systems, and computer-readable media for providing event sequencing with seek bar functionality within a view of a metaverse place of a virtual metaverse.

BACKGROUND

Computer audio and video (e.g., listening or viewing of media items) oftentimes consists of playback in a standalone application or interface. The standalone application may be configured to provide a seek-bar or cueing function, whereby a user can manipulate the positioning of the seek-bar to cue music or media forward/backwards to replay based on a final position of the seek-bar slider and replaying a file at that point in time. Other variations exist and also rely upon replaying individual media files based upon a time stamp, such as video recordings, audio recordings, soundtracks, etc.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to providing event sequencing in a virtual metaverse.

According to one aspect, a computer-implemented method comprises: receiving a request to cue a scene associated with a metaverse place from a user device, the scene associated with a master timeline of events, wherein each event of the master timeline of events is associated with a respective time point on the master timeline, and wherein the request includes a first cue point. The computer-implemented method may also comprise retrieving scene data associated with the scene, identifying a set of events with time points that are at or after the first cue point, transitioning the master timeline to the first cue point, recreating the set of events based upon a current point in the master timeline after the transitioning and in a sequence based on the master timeline, and providing the recreated events for display at the user device.

According to some implementations, the master timeline of events comprises at least a sequence of events that have occurred in the metaverse place from an origin point in time.

According to some implementations, the scene comprises one or more virtual items, objects, or virtual characters within the metaverse place.

According to some implementations, retrieving scene data comprises retrieving spatial telemetry associated with one or more of the virtual items, objects or virtual characters.

According to some implementations, identifying the set of events comprises locating the first cue point on the master timeline of events, and identifying all events occurring at or after the first cue point from the master timeline of events.

According to some implementations, recreating the set of events comprises transmitting each event of the set of events, in the sequence, to a virtual experience application of the user device for recreation.

According to some implementations, recreating the set of events comprises transmitting each event of the set of events, in the sequence, to a virtual experience engine of a server for recreation.

According to some implementations, providing the recreated events for display at the user device comprises transmitting the recreated events, in the sequence, to a virtual experience application executing on the user device.

In another aspect, a system is disclosed, comprising: a memory with instructions stored thereon; and a processing device, coupled to the memory, the processing device configured to access the memory, wherein the instructions when executed by the processing device, cause the processing device to perform operations including: receiving a request to cue a scene associated with a metaverse place from a user device, the scene associated with a master timeline of events, wherein each event of the master timeline of events is associated with a respective time point on the master timeline, and wherein the request includes a first cue point; retrieving scene data associated with the scene; identifying a set of events with time points that are at or after the first cue point; transitioning the master timeline to the first cue point; recreating the set of events based upon a current point in the master timeline after the transitioning and in a sequence based on the master timeline; and providing the recreated events for display at the user device.

According to some implementations, the master timeline of events comprises at least a sequence of events that have occurred in the metaverse place from an origin point in time.

According to some implementations, the scene comprises one or more virtual items, objects, or virtual characters within the metaverse place.

According to some implementations, retrieving scene data comprises retrieving spatial telemetry associated with one or more of the virtual items, objects or virtual characters.

According to some implementations, identifying the set of events comprises locating the first cue point on the master timeline of events, and identifying all events occurring at or after the first cue point from the master timeline of events.

According to some implementations, recreating the set of events comprises transmitting each event of the set of events, in the sequence, to a virtual experience application of the user device for recreation.

According to some implementations, recreating the set of events comprises transmitting each event of the set of events, in the sequence, to a virtual experience engine of a server for recreation.

According to some implementations, providing the recreated events for display at the user device comprises transmitting the recreated events, in the sequence, to a virtual experience application executing on the user device.

In yet another aspect, a non-transitory computer-readable medium with instructions stored thereon is disclosed that, responsive to execution by a processing device, causes the processing device to perform operations comprising: receiving a request to cue a scene associated with a metaverse place from a user device, the scene associated with a master timeline of events, wherein each event of the master timeline of events is associated with a respective time point on the master timeline, and wherein the request includes a first cue point; retrieving scene data associated with the scene; identifying a set of events with time points that are at or after the first cue point; transitioning the master timeline to the first cue point; recreating the set of events based upon a current point in the master timeline after the transitioning and in a sequence based on the master timeline; and providing the recreated events for display at the user device.

According to some implementations, the master timeline of events comprises at least a sequence of events that have occurred in the metaverse place from an origin point in time.

According to some implementations, the scene comprises one or more virtual items, objects, or virtual characters within the metaverse place.

According to some implementations, retrieving scene data comprises retrieving spatial telemetry associated with one or more of the virtual items, objects or virtual characters.

According to yet another aspect, portions, features, and implementation details of the systems, computing devices, methods, and non-transitory computer-readable media disclosed herein may be combined to form additional aspects, including some aspects which omit and/or modify some or portions of individual components or features, include additional components or features, and/or other modifications; and all such modifications are within the scope of this disclosure.

BRIEF DESCRIPTION OF THE DRAWINGS

FIG. 1 is a diagram of an example network environment for providing metaverse event sequencing, in accordance with some implementations.

DETAILED DESCRIPTION

Figure 2:
FIG. 2 is a diagram of an example network environment for providing metaverse event sequencing, in accordance with some implementations.

One or more implementations described herein relate to metaverse event sequencing for an online virtual experience platform. Features can include automatically transitioning between scenes associated with a metaverse place. The scenes may be scenes arranged to provide a virtualized experience such as a virtual performance. The virtual performance may include a virtual concert, virtual conference, virtual speaking event, virtual orchestra performance, virtual musical performance, virtual lecture, virtual classroom study, and/or any suitable performance that can be virtualized. The virtual performance may be based on a schedule or timeline, and the schedule or timeline may be associated with a master timeline of events.

Features described herein include the master timeline of events associated with a metaverse place such that users may cue, fast forward, reverse, and/or otherwise request a recreation of events of the master timeline. The request may include manipulation of a "seek bar" or "cue bar" in a graphical user interface (GUI). Upon receipt of the request, an online virtual experience platform may provide recreation of the events based on a positioning of the seek or cue bar. It is noted that the recreation of events does not comprise the playback of a video recording, and instead relies upon recreated events.

Through recreation of events based on a master timeline, several technical effects and benefits may be realized. For example, reduced network bandwidth due to event data requiring less bandwidth as compared to streamed video. For example, improved computational performance of servers because recreating event sequences is computationally cheaper than recording, streaming, and playing back video. Furthermore, for example, reduced energy requirements for an online virtual experience platform can be realized due to the improved computational performance and reduced network bandwidth. Furthermore, through implementation of a virtual seek or cue bar, users may have control over exactly how they wish to experience virtualized performances. This may provide a more immersive and enjoyable experience for users of a virtual experience platform.

Online virtual experience platforms and online gaming platforms (also referred to as "user-generated content platforms" or "user-generated content systems") offer a variety of ways for users to interact with one another. For example, users of an online virtual experience platform may create virtual experiences or other content or resources (e.g., characters, graphics, items for game play and/or use within a virtual metaverse, etc.) within the online platform. Users may also design performances such as movies, theater, concerts, and other performances.

Users of an online virtual experience platform may work together towards a common goal in a metaverse place, game, or in game creation; share various virtual items (e.g., inventory items, game items, etc.); engage in audio chat, send electronic messages to one another, and so forth. Users of an online virtual experience platform may interact with others and play games, e.g., including characters (avatars) or other game objects and mechanisms. An online virtual experience platform may also allow users of the platform to communicate with each other. For example, users of the online virtual experience platform may communicate with each other using voice messages or live voice interaction, text messaging, video messaging, or a combination of the above. Some online virtual experience platforms can provide a virtual three-dimensional environment or multiple environments linked within a metaverse, in which users can interact with one another or play an online game.

In order to help enhance the entertainment value of an online virtual experience platform, the platform can provide rich audio and video for playback at a user device. The audio can include, for example, different audio streams associated with a performance, as well as background audio. According to various implementations described herein, the different audio streams can be associated with a master timeline of events, such that events may be recreated based upon audio telemetry. For example, a first user may request to cue a performance to a first cue point. Thereafter, events that are assigned to occur at the first cue point or in the future may be automatically sequenced to occur based on the master timeline and in sequence with associated audio. In this regard, users may control how they experience virtual performances while enabling accurate recreation of events. Accordingly, a user device may receive events (e.g., virtual scenes, items, and performance activities) to be recreated in an appropriate sequence such as if the events were occurring in real-time, allowing the user to interact with the events (e.g., within the event in a metaverse place or virtual experience) in actuality, rather than simply watching a recording. The user may also re-cue to different points in time in the future to "catch up" with the experience, re-cue to points in the past to re-experience them, and so forth.

Figure 3:
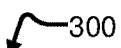
FIG. 3 is a diagram of an example metaverse event sequencing pipeline, in accordance with some implementations.

FIGS. 1-3: System Architecture

FIG. 1 illustrates an example network environment 100, in accordance with some implementations of the disclosure. The network environment 100 (also referred to as "system" herein) includes an online virtual experience platform 102, a first client device 110, a second client device 116 (generally referred to as "client devices 110/116" herein), all connected via a network 122. The online virtual experience platform 102 can include, among other things, a virtual experience engine 104, one or more virtual experiences 105, an event sequencing component 106, and a data store 108.

The client device 110 can include a virtual experience application 112, and the client device 116 can include a virtual experience application 118. Users 114 and 120 can use client devices 110 and 116, respectively, to interact with the online virtual experience platform 102 and with other users utilizing the online virtual experience platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the data store 108 may include storage of a master timeline of events, as well as storage of events, scenes, actions, and other virtualized portions of a performance. The master timeline of events may be read and/or accessed through the data store 108, and scenes or portions thereof may be accurately recreated based on the master timeline of events.

In some implementations, the online virtual experience platform 102 can include a server having one or more computing devices (e.g., a cloud computing system, a rackmount server, a server computer, cluster of physical servers, virtual server, etc.). In some implementations, a server may be included in the online virtual experience platform 102, be an independent system, or be part of another system or platform.

In some implementations, the online virtual experience platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience platform 102 and to provide a user with access to online virtual experience platform 102. The online virtual experience platform 102 may also include a website (e.g., one or more webpages) or application back-end software that may be used to provide a user with access to content provided by online virtual experience platform 102. For example, users 114/120 may access online virtual experience platform 102 using the virtual experience application 112/118 on client devices 110/116, respectively.

In some implementations, online virtual experience platform 102 may include a type of social network providing connections between users or a type of user-generated content system that allows users (e.g., end-users or consumers) to communicate with other users via the online virtual experience platform 102, where the communication may include voice chat (e.g., synchronous and/or asynchronous voice communication), video chat (e.g., synchronous and/or asynchronous video communication), or text chat (e.g., synchronous and/or asynchronous text-based communication).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience platform 102 may be a virtual gaming platform. For example, the gaming platform may provide single-player or multi-player games to a community of users that may access or interact with games (e.g., user generated games or other games) using client devices 110/116 via network 122. In some implementations, games (also referred to as "video game," "online game," "metaverse place," or "virtual experiences" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, online virtual experience platform 102 may be a virtual performance platform. For example, the performance platform may provide users with rich virtualized performances based on a master timeline of events. In some implementations, an audio file may be linked to the master timeline of events. The audio file may include one or more audio tracks associated with a performance, such as a musical performance or a lecture. In some implementations, performances (also referred to as "virtual performances," "virtual concerts," "virtual performance experiences," and similar terms) may include one or more performers in the form of avatars that may be controlled by a performer, or may be similar to non-player characters in a virtual experience that perform based on events of the master timeline of events. In some implementations, users may cue and alter a position on the master timeline of events, and participate in the associated virtual experience with other users. In some implementations, a performance may be experiences in real-time with other users of the performance.

In some implementations, other collaboration platforms can be used with the features described herein instead of or in addition to online virtual experience platform 102 and/or event sequencing component 106. For example, additional abstraction may include sub-components for the event sequencing component 106 as well as separate components configured to perform different tasks. Additionally, for example, a social networking platform, purchasing platform, messaging platform, creation platform, etc. can be used with the event sequencing features such that users may experience portions of virtualized events prior to purchase and/or subscription.

In some implementations, gameplay may refer to interaction of one or more players using client devices (e.g., 110 and/or 116) within a game (e.g., virtual experience 105) or the presentation of the interaction on a display or other output device of a client device 110 or 116. In some implementations, gameplay instead refers to interaction within a virtual experience or metaverse place, and may include objectives that are dissimilar, different, or the same as some games. Furthermore, although referred to as "players," the terms "avatars," "users," and/or other terms may be used to refer to users engaged with and/or interacting with an online virtual experience.

One or more virtual experiences 105 are provided by the online virtual experience platform. In some implementations, a virtual experience 105 can include an electronic file that can be executed or loaded using software, firmware or hardware configured to present the virtual content (e.g., digital media item) to an entity. In some implementations, a virtual experience application 112/118 may be executed and a virtual experience 105 rendered in connection with a virtual experience engine 104. In some implementations, a virtual experience 105 may have a common set of rules or common goal, and the virtual environments of a virtual experience 105 share the common set of rules or common goal. In some implementations, different virtual experiences may have different rules or goals from one another.

In some implementations, games and/or virtual experiences may have one or more environments (also referred to as "gaming environments," "metaverse places," or "virtual environments" herein) where multiple environments may be linked. An example of an environment may be a three-dimensional (3D) environment. The one or more environments of a virtual experience 105 or virtual experience may be collectively referred to as a "world," "gaming world," "virtual world," "universe," or "metaverse" herein. An example of a world may be a 3D metaverse place of a virtual experience 105. For example, a user may build a metaverse place that is linked to another metaverse place created by another user, different from the first user. A character of the virtual experience may cross the virtual border to enter the adjacent metaverse place. Additionally, sounds, theme music, and/or background music may also traverse the virtual border such that avatars standing within proximity of the virtual border may listen to audio that includes at least a portion of the sounds emanating from the adjacent metaverse place.

It may be noted that 3D environments or 3D worlds use graphics that use a three-dimensional representation of geometric data representative of content (or at least present content to appear as 3D content whether or not 3D representation of geometric data is used). 2D environments or 2D worlds use graphics that use two-dimensional representation of geometric data representative of game content.

In some implementations, the online virtual experience platform 102 can host one or more virtual experiences 105 and can permit users to interact with the virtual experiences 105 (e.g., search for experiences, games, game-related content, virtual content, virtual concert, virtual lecture, or other content) using a virtual experience application 112/118 of client devices 110/116. Users (e.g., 114 and/or 120) of the online virtual experience platform 102 may play, create, interact with, or build virtual experiences 105, search for virtual experiences 105, communicate with other users, create and build objects (e.g., also referred to as "item(s)" or "game objects" or "virtual game item(s)" herein) of virtual experiences 105, and/or search for objects. For example, in generating user-generated virtual items, users may create characters, decoration for the characters, one or more virtual environments for an interactive game, or build structures used in a virtual experience 105, among others.

In some implementations, users may buy, sell, or trade virtual game objects, such as in-platform currency (e.g., virtual currency), with other users of the online virtual experience platform 102. In some implementations, online virtual experience platform 102 may transmit game content to game applications (e.g., virtual experience application 112). In some implementations, game content (also referred to as "content" herein) may refer to any data or software instructions (e.g., game objects, game, user information, video, images, commands, media items, etc.) associated with online virtual experience platform 102 or game applications.

In some implementations, game objects (e.g., also referred to as "item(s)" or "objects" or "virtual game item (s)" herein) may refer to objects that are used, created, shared or otherwise depicted in virtual experiences 105 of the online virtual experience platform 102 or virtual experience applications 112 or 118 of the client devices 110/116. For example, game objects may include a part, model, character, tools, weapons, clothing, buildings, vehicles, currency, flora, fauna, components of the aforementioned (e.g., windows of a building), and so forth.

It may be noted that the online virtual experience platform 102 hosting virtual experiences 105, is provided for purposes of illustration, rather than limitation. In some implementations, online virtual experience platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 105 may be associated with a particular user or a particular group of users (e.g., a private game), or made widely available to users of the online virtual experience platform 102 (e.g., a public game). In some implementations, where online virtual experience platform 102 associates one or more virtual experiences 105 with a specific user or group of users, online virtual experience platform 102 may associated the specific user(s) with a virtual experience 105 using user account information (e.g., a user account identifier such as username and password). Similarly, in some implementations, online virtual experience platform 102 may associate a specific developer or group of developers with a virtual experience 105 using developer account information (e.g., a developer account identifier such as a username and password).

In some implementations, online virtual experience platform 102 or client devices 110/116 may include a virtual experience engine 104 or virtual experience application 112/118. The virtual experience engine 104 can include a virtual experience application similar to virtual experience application 112/118. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, machine learning models, translation components, spatialized audio manager/engine, audio mixers, audio subscription exchange, audio subscription logic, audio subscription prioritizers, real-time communication engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) and provide event sequencing. In some implementations, virtual experience applications 112/118 of client devices 110/116, respectively, may work independently, in collaboration with virtual experience engine 104 of online virtual experience platform 102, or a combination of both.

In some implementations, both the online virtual experience platform 102 and client devices 110/116 execute a virtual experience engine (104, 112, and 118, respectively). The online virtual experience platform 102 using virtual experience engine 104 may perform some or all the virtual experience engine functions (e.g., generate physics commands, rendering commands, spatialized audio commands, etc.), or offload some or all the virtual experience engine functions to virtual experience engine 104 of client device 110. In some implementations, each virtual experience 105 may have a different ratio between the virtual experience engine functions that are performed on the online virtual experience platform 102 and the virtual experience engine functions that are performed on the client devices 110 and 116.

For example, the virtual experience engine 104 of the online virtual experience platform 102 may be used to generate physics commands in cases where there is a collision between at least two virtual objects, while the additional virtual experience engine functionality (e.g., generate rendering commands or combining spatialized audio streams) may be offloaded to the client device 110. In some implementations, the ratio of virtual experience engine functions performed on the online virtual experience platform 102 and client device 110 may be changed (e.g., dynamically) based on gameplay conditions. For example, if the number of users participating in gameplay of a virtual experience 105 exceeds a threshold number, the online virtual experience platform 102 may perform one or more virtual experience engine functions that were previously performed by the client devices 110 or 116.

For example, users may be engaging with a virtual experience 105 on client devices 110 and 116, and may send control instructions (e.g., cue inputs, seek-bar inputs, user inputs, such as right, left, up, down, user election, or character position and velocity information, etc.) to the online virtual experience platform 102. Subsequent to receiving control instructions from the client devices 110 and 116, the online virtual experience platform 102 may send gameplay instructions (e.g., position and velocity information of the characters participating in the group gameplay or commands, such as rendering commands, collision commands, spatialized audio commands, etc.) or event sequencing data to the client devices 110 and 116 based on the control instructions. For instance, the online virtual experience platform 102 may perform one or more logical operations (e.g., using virtual experience engine 104) on the control instructions to generate gameplay instruction for the client devices 110 and 116. In other instances, online virtual experience platform 102 may pass one or more or the control instructions from one client device 110 to other client devices (e.g., 116) participating in the virtual experience 105. The client devices 110 and 116 may use the gameplay instructions and render the gameplay for presentation on the displays of client devices 110 and 116.

In some implementations, the control instructions may refer to instructions that are indicative of in-experience actions of a user's character. For example, control instructions may include user input to control the in-experience action, such as right, left, up, down, user selection, gyroscope position and orientation data, force sensor data, etc. The control instructions may include character position and velocity information. In some implementations, the control instructions are sent directly to the online virtual experience platform 102. In other implementations, the control instructions may be sent from a client device 110 to another client device (e.g., 116), where the other client device generates gameplay instructions using the local virtual experience engine 104. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a virtual experience, such as a multiplayer game or virtual experience. The gameplay instructions may include one or more of user input (e.g., control instructions), character position and velocity information, or commands (e.g., physics commands, rendering commands, collision commands, etc.).

In some implementations, characters (or virtual objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., head, hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that in some implementations, a character may not include a character game object (e.g., body parts, etc.) but the user may control the character (without the character game object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience platform 102. In some implementations, creating, modifying, or customizing characters, other virtual objects, virtual experiences 105, or virtual environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online virtual experience platform 102 may store characters created by users in the data store 108. In some implementations, the online virtual experience platform 102 maintains a character catalog and virtual experience catalog that may be presented to users via the virtual experience engine 104, virtual experience 105, and/or client device 110/116. In some implementations, the virtual experience catalog includes images of virtual experiences stored on the online virtual experience platform 102. In addition, a user may select a character (e.g., a character created by the user or other user) from the character catalog to participate in the chosen experience. The character catalog includes images of characters stored on the online virtual experience platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online virtual experience platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the virtual experience application 112 or 118, respectively. In one implementation, the virtual experience application 112 or 118 may permit users to use and interact with online virtual experience platform 102, such as search for a virtual experience, virtual item, or other content; control a virtual character in a virtual experience hosted by online virtual experience platform 102, or view or upload content, such as virtual experiences 105, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 or 116 and allows users to interact with online virtual experience platform 102. The virtual experience application may render, display, or present the content (e.g., a web page, a user interface, a media viewer, an audio stream) to a user. In an implementation, the virtual experience application may also include an embedded media player that is embedded in a web page.

According to aspects of the disclosure, the virtual experience application 112/118 may be an online virtual experience platform application for users to build, create, edit, upload content to the online virtual experience platform 102 as well as interact with online virtual experience platform 102 (e.g., play virtual experiences 105 hosted by online virtual experience platform 102). As such, the virtual experience application 112/118 may be provided to the client device 110 or 116 by the online virtual experience platform 102. In another example, the virtual experience application 112/118 may be an application that is downloaded from a server.

In some implementations, a user may login to online virtual experience platform 102 via the virtual experience application. The user may access a user account by providing user account information (e.g., username and password) where the user account is associated with one or more characters available to participate in one or more virtual experiences 105 of online virtual experience platform 102.

In general, functions described as being performed by the online virtual experience platform 102 can also be performed by the client device(s) 110 or 116, or a server, in other implementations if appropriate. In addition, the functionality attributed to a particular component can be performed by different or multiple components operating together. The online virtual experience platform 102 can also be accessed as a service provided to other systems or devices through appropriate application programming interfaces (APIs), and thus is not limited to use in websites.

In some implementations, online virtual experience platform 102 may include an event sequencing component 106 and/or an event application programming interface (event API) 130. In some implementations, the event sequencing component 106 may include the event API 130 as a portion thereof (instead of separate components).

In general, the event API 130 comprises a suite of computer-executable code that provides functionality to users and/or developers in the form of function calls that allow software components to communicate and/or provide/receive data. The API includes a plurality of defined software functions for metaverse event sequencing, which can be used by developers to enable creation of virtual experience and performances that can be cued or controlled similar to a video player, and can include any function related to similar playback functions at a user device.

In some implementations, the event API 130 includes functions that enable: creation of virtualized performances efficiently and quickly by following a structured framework; implementing visual effects to specified timestamps of an audio file; moving players from one place to another place in the virtual metaverse without having to use methods like teleportation; joining performances in the middle (time-wise) and not miss the entire experience; seeking through the performance to specific points in time; providing an interactive "seek bar" or "cue bar" to scrub through the performance; play/pause a performance; skip forward/skip backward in a performance; set time vs fast forward/rewind; manual time input; specifying audio and length of events; choosing particular audio and/or environments for testing performances; and other suitable functionality.

In some implementations, the event sequencing component 106 is a software component that provides metaverse event sequencing functionality based on user requests to cue or manipulate a master timeline of events. For example, in some implementations, the event sequencing component 106 may include one or more physics components, one or more audio components, one or more video components, one or more plugins for communication with a plurality of third-party services, and/or any other suitable components for recreation of metaverse events in sequence based upon a master timeline of events.

Hereinafter, operation of the online virtual experience platform 102 with regard to providing event sequencing, is described more fully with reference to FIG. 2.

FIG. 2 is a diagram of an example network environment 200 (e.g., a subset of the network environment 100) for providing metaverse event sequencing in a virtual metaverse, in accordance with some implementations. Network environment 200 is provided for illustration. In some implementations, the network environment 200 may include the same, fewer, more, or different elements configured in the same or different manner as that shown in FIG. 2.

As shown in FIG. 2, the online virtual experience platform 102 may be in communication with client device 110 and client device 116 such that metaverse events retrieved from data store 108 are transmitted to client devices 110/116, over the network 122.

The online virtual experience platform 102, in addition to those components illustrated in FIG. 1, may include a scene switcher component 202, a conductor component 204, and an orchestration component 206. In some implementations, the scene switcher component 202, conductor component 204, and orchestration component 206 may be sub-components of the event sequencing component 106 and/or event API 130. In some implementations, the scene switcher component 202, conductor component 204, and orchestration component 206 may be separate components from the event sequencing component 106 and/or event API 130.

The scene switcher component 202 may be configured to retrieve data associated with individual scenes and events of a master timeline of events of a virtual performance. For example, a scene may be a particular virtual environment for display during a performance. As such, scenes may include stages, concert venues, auditoriums, or any suitable scene where a virtual performance may take place. The events may include a plurality of virtualized actions, such as fireworks, lighting effects, movements, activities, and/or any virtualized representation of a physical event in time. The events may include virtual objects, virtual items, virtual characters, and so on. Furthermore, the events may be recreated based upon spatial telemetry data and/or other data that describes how the events (and the virtual items within the events) occur.

The conductor component 204 may be configured to provide alignment of events to the master timeline of events for recreation at the client devices 110/116. For example, alignment may be based upon aligning a point of origin of the master timeline of events and a cue point provided by a user, such that all events occurring after the cue point can be identified in sequence of occurrence.

The orchestration component 206 may be configured to provide orchestration of events, scenes, and a virtual performance.

Hereinafter, operation of individual components from FIG. 2 is described more fully with reference to FIG. 3.

FIG. 3 is a diagram of an example operation pipeline 300 for metaverse event sequencing in a virtual metaverse, in accordance with some implementations. Pipeline 300 is provided for illustration. In some implementations, the pipeline 300 may include the same, fewer, more, or different elements and/or sequence of operations configured in the same or different manner as that shown in FIG. 3.

Illustrated and presented in FIG. 3 is a pipeline 300 with numbered stages (e.g., 1-10), wherein like numerals represent a similar, parallel, and/or substantially parallel stage of the pipeline. Furthermore, acronyms for a media controller (MC) and metadata processor (MP) are used in the interest of clarity in the illustration. It is noted that in some implementations the specific ordering of the stages of the pipeline may be altered without departing from the scope of this disclosure. For example, loading stages may be staggered and/or omitted depending upon a particular implementation. For example, processing stages may be staggered and/or ordered differently depending upon a computing state of the system and sub-components. For example, several stages may be performed in parallel in some implementations. These and other implementation changes are within the scope of this disclosure.

As shown in FIG. 3, scene switcher component 202 may include a stateful architecture that keeps track of if a scene is loading, the current scene's environment, e.g., related three-dimensional (3D) assets, and if a player has loaded a scene successfully at a respective client device. The scene switcher component 202 may also listen for events that are triggered when a user wants to switch scenes via a scene list. The scene switcher component 202 may also listen for events to programmatically load a new scene and while doing so, request the conductor component 204 to start orchestrating the new scene after loading.

The scene switcher component 202 further automatically orchestrates if a scene already is loaded into workspace by using a "loadscene" function of the event API 130. The scene switcher component may also instruct a client device to unload client assets for an old scene, anchor the player between scenes, and load new client related assets for a new scene, as well as instruct newly joined players/client devices to load a scene if one already exists.

As described briefly above, the data store 108 may be configured to store scene data and various API functionality for access by the virtual experience platform 102. In some implementations, the data store 108 is configured to store a scenes folder 208 (and a schema folder, in some implementations) comprising data associated with scenes for a performance, as well as individual events. Through use of the event API 130, a ClientSceneFramework framework of functions may be accessed.

The ClientSceneFramework may enable communication with other frameworks of the event API 130 such as a ServerSceneFramework for determining when a scene has loaded. The ServerSceneFramework may also fire an event to the client to be consumed and instructing the client that said client has loaded a scene. The event API 130 and associated functions may also enable anchoring a player/avatar between scenes, unloading and loading of new assets, updating effects and/or lighting for each client for a new scene, and placing players/avatars in spawn locations specified in a scene's environment folder stored at data store 108.

The conductor component 204 may provide a logical abstraction for event API 130 to separate the systems of Orchestration 206 and Scene Switcher 202. The conductor component 204 may be used in the framework by a consumer facing API as well as the ServerSceneFramework described above. Furthermore, the conductor component 204 may create various logical controllers to start orchestrating a scene.

The orchestration component 206 may include a plurality of individual components such as a media controller, clock, schema processor, schema, configuration classes, seek permissions, and/or client orchestration. The orchestration component 206 may also include additional components configured to perform various additional functions as described herein.

The media controller may be configured to manage the moving parts of orchestration. The media controller monitors time (e.g., the clock) in order to send signals when a scene is ready to be orchestrated on the client, is ending (server and client), and has ended (server/client). The media controller may be a class that can be instanced multiple times as there is one MC (Media Controller) per scene. The media controller may also instruct the server and client to seek and/or cue through a scene or scenes of a performance.

The clock is an abstraction on a number value that continues counting up, it can stop, start, reset, and be set. As such, it is replaceable with any time keeping implementation or variation. It is noted that every scene for a performance may have an instance of a clock.

The schema processor is a component that may be called as needed to handle errors, warnings, resets, caches, and order configurations of a schema.

The schema is the lifecycle of a scene. The schema is responsible for caching initial properties of 3D assets so that when a user joins a performance late or seeks through a performance, properties are applied in order from their starting values based on the master timeline of events. Separately, the configurations specified in the master timeline of events are organized in order at the schema.

The configuration classes are files that allow users to create configurations on the timeline(s)/schema of their respective scenes. Such configurations include animations, schedule, interval, audio, interpolations of instances of events (e.g., "tweens"), and/or video. As used herein, "tweens" are defined as interpolations of instances of events, such that an event which begins at a first timestamp A, and ends at an ending timestamp Z, may include several interpolated sub-events at times B, C, D, and so on. In this manner, a "tween" can define a trajectory of a physical event such that when recreated, even if the initial starting point of the event is in the past, the online virtual experience platform 102 may provide for recreation of the event at any intervening time point defined by the tween that occurs on or after a requested cue point. All configurations (e.g., these and others) may have properties that users can change and have their own cleanup mechanism. Configurations may each get called to process by the schema processor.

In some implementations, the seek permissions is a file that manages the permissions for users to be able to seek and/or cue through events, which is set by the developers server-side via the events API 130.

In some implementations, the client orchestration is a file to listen for seeking permissions to display users with a user interface comprising a seek or cue bar. The client orchestration file also acts similar to the schema processor, but for the client functions. The client orchestration file manages the setup, process, and end-scene for the client by keeping track of when calls were made in order to avoid orchestrating outdated scenes. Outdated scene orchestration can occur when a user joins an experience during the transition between two scenes or if there's a race condition by multiple orchestration calls. Accordingly, the client orchestration file ensures alignment of a client device's current scene with the master timeline of events.

In addition to the portions of the schemas described above with reference to the event API 130, seek bar and scene list functionality may also be provided. For example, an interactive bar representing a timeline of a scene that users can click around in order to seek forward or backwards in time may be provided. Seeking replays the entire scene's schema's configuration on both client and server. However, when a user joins as a client, it is equivalent to seeking forward as their client's schema is catching up to the point in time when they joined. The scene list is a component configured to keep track of the scenes in a performance and lists them to be loaded in-experience.

The framework and pipeline of FIG. 3 may be built on top of developer modules and various APIs, or may also be built upon other abstraction techniques. As described briefly above, a seek bar or cue bar may be provided within the event API to provide users an ability to request cueing through, cueing backwards, and/or curing forwards along a master timeline of events. The seek bar or cue bar may be presented as a portion of a user interface.

Hereinafter, an example user interface with metaverse event sequencing is described with reference to FIG. 4.

Figure 4:
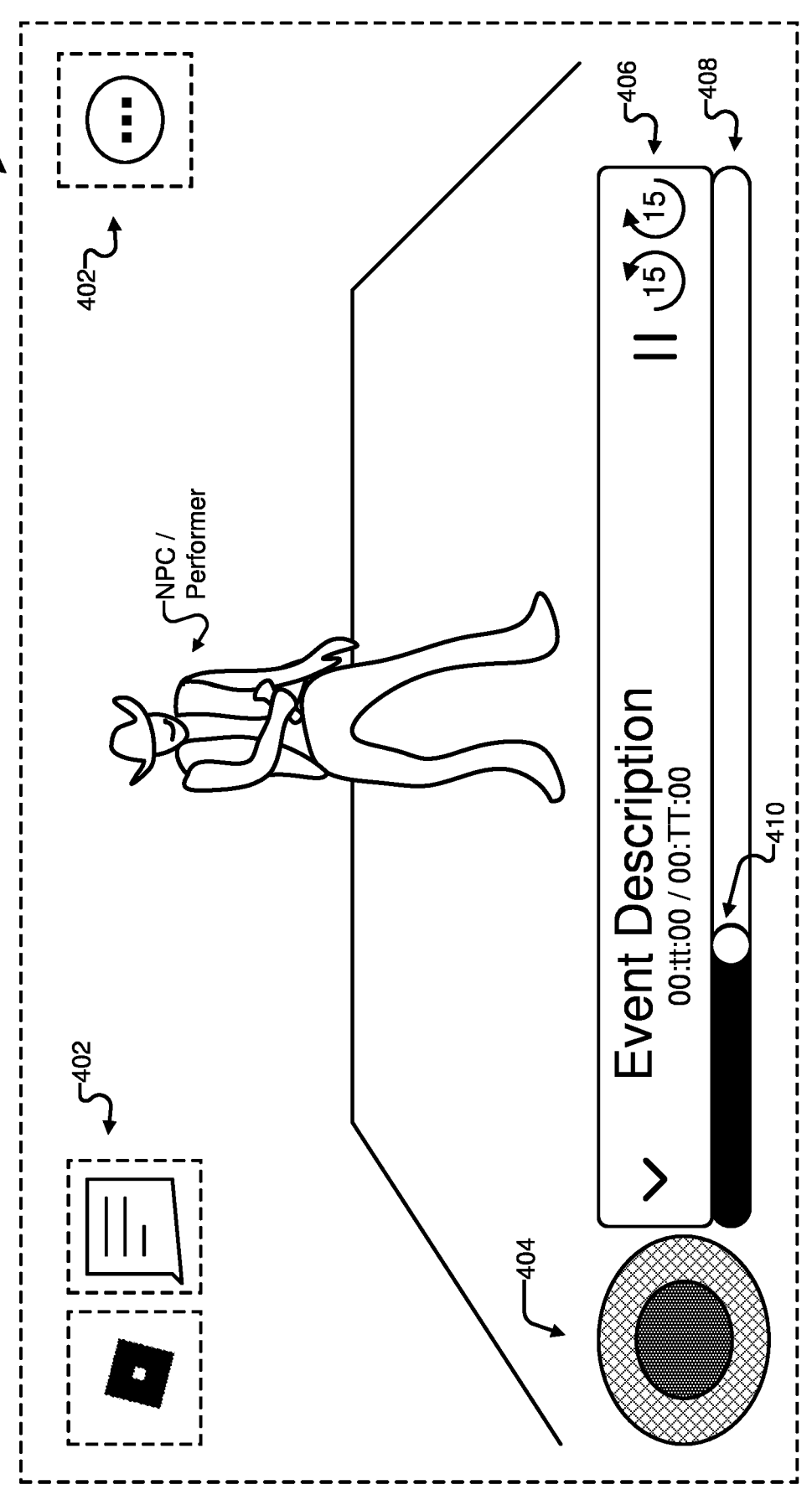
FIG. 4 is a diagram showing an example graphical user interface with a metaverse event seek bar, in accordance with some implementations.

FIG. 4 is a diagram showing an example graphical user interface (GUI) 400 with a metaverse event seek bar 408, in accordance with some implementations. In some implementations, the GUI 400 may be presented as an overlay to a view of a virtual experience being presented at a client device, or as, for example, a virtual reality interface or augmented reality interface.

The GUI 400 may include a plurality of controls 402 to allow a user to request access to menus, save progress, go home, engage in chat, and other functions.

The GUI 400 may also include a control stick 404 to allow the user to control an avatar within a virtual experience. In some implementations, the control stick 404 may be: omitted, replaced with a different control element, may be replaced with several control elements, and/or may be presented differently than illustrated.

The GUI 400 may also include a descriptive bar 406 that presents a user with a text and/or graphical description of a particular event, scene, or performance. The descriptive bar 406 may also present a display of a place on a master timeline of events in the form of a time clock with a present time and total time of a performance. In addition, the descriptive bar 406 may also present basic controls such as skip forward, skip backwards, play, pause, etc.

The GUI 400 may also include seek bar 408 with cue slider 410. The cue slider 410 may allow a user to visualize a requested position to cue a performance to. The cue slider 410 may be similar to seek bar functionality provided in video playback applications, with the distinction that the cue slider denotes a point in time to begin recreating and rendering a virtual experience.

As a user moves the cue slider 410, a performance and non-player character (NPC)/performer displayed may be repositioned to the requested point in time such that a user can experience the event in-experience (e.g., from any viewpoint and by moving around within the virtual environment as the event is ongoing to view the event from various viewpoints), rather than just view a recording. In this manner, the user may choose to re-experience portions of the performance, fast-forward through parts of the performance, and/or reverse through portions of the performance, at will. The user may also pause and resume a performance based on these controls.

Hereinafter, a method of cueing through metaverse scenes based on a master timeline of events is provided with reference to FIG. 5.

Figure 5:
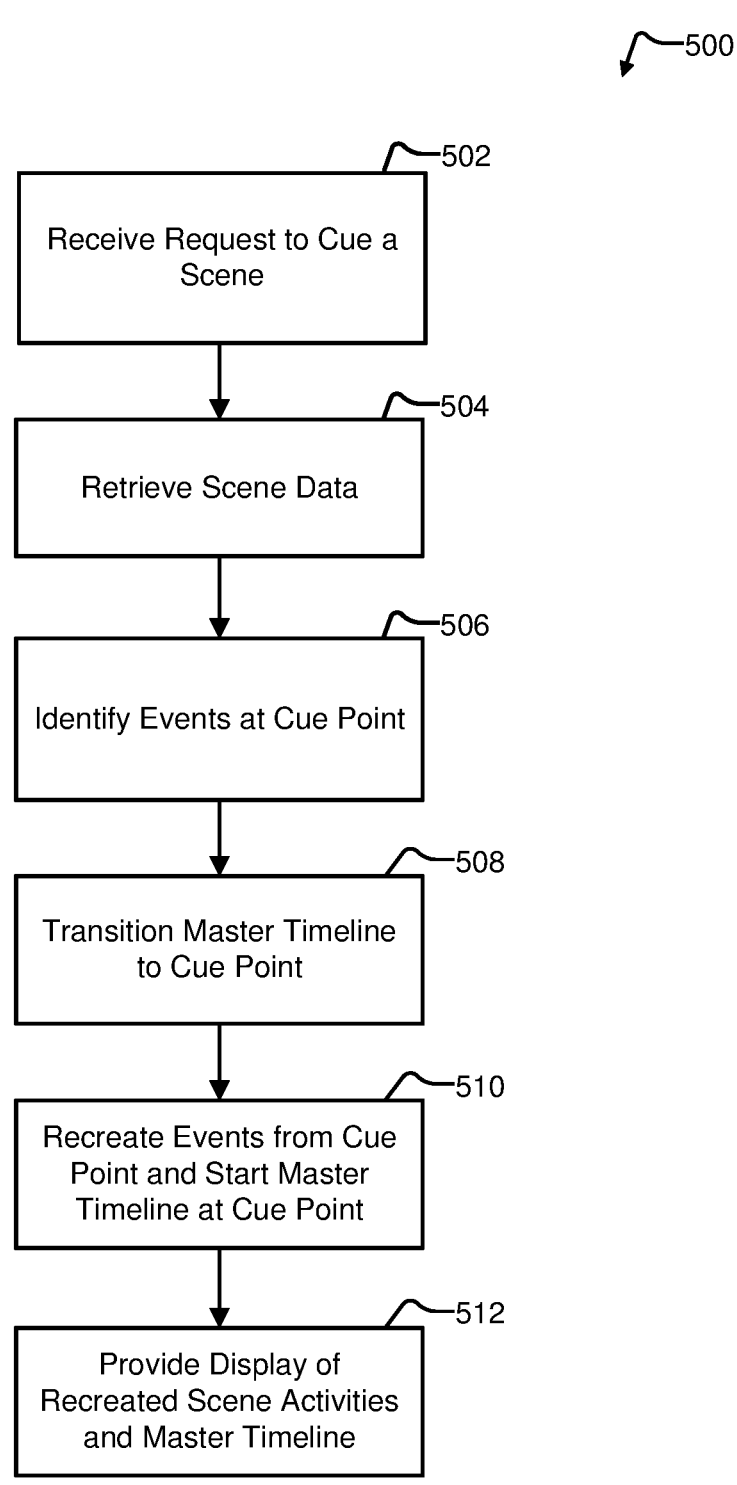
FIG. 5 is a flowchart of an example method to provide metaverse event sequencing, in accordance with some implementations.

FIG. 5: Example Method to Cue Through Metaverse Scenes

FIG. 5 is a flowchart of an example method 500 to cue through metaverse scenes (e.g., view a virtual experience), in accordance with some implementations. In some implementations, method 500 can be implemented, for example, on a server system, e.g., online virtual experience platform 102 as shown in FIG. 1. In some implementations, some or all of the method 500 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 500. Method 500 may begin at block 502.

At block 502, a request to cue a scene is received. The request may be a request to cue a scene associated with a metaverse place and may be received at a virtual experience platform from a user device. The scene may be associated with a master timeline of events, wherein each event of the master timeline of events are each associated with a time point on the master timeline. Furthermore, the request may include at least a first cue point denoting a point in time to which a user requests to cue a scene. Block 502 is followed by block 504.

At block 504, scene data associated with the scene being cued is retrieved. For example, scene data may be retrieved from a scene folder 208 and/or a data store 108. The scene data may include actions, events, virtual items, backgrounds, sounds, and other virtualized items that are associated with a performance and/or scene. Block 504 is followed by block 506.

At block 506, a set of events with time points that occur at and after the first cue point are identified. For example, if a cue point denotes time T, all events occurring at time T or afterwards may be identified. The events may be organized according to the master timeline of events, for example, in an order in which the events are to be recreated. Block 506 is followed by block 508.

At block 508, the master timeline is transitioned to the first cue point. For example, audio may be associated or linked to the master timeline of events. The audio may include pre-recorded audio configured to be played back at particular points in time. The transitioning may include instructing client devices (e.g., the client device issuing the cue request) to align audio playback to the first cue point. Block 508 is followed by block 510.

At block 510, the set of events is recreated at the requesting client device, based upon a current point in the master timeline after the transitioning and in a sequence dictated by the master timeline. For example, the set of events are organized in order based upon the master timeline of events. As a new time clock instance begins from the first cue point, events in the set are presented to the user as the new time clock reaches the appropriate time on the master timeline of events. Block 510 is followed by block 512.

At block 512, the recreated events are provided for display at the user device. Accordingly, instead of playing back a recording or video, each event in the set is recreated (e.g., rendered afresh based on stored data and timeline, at a virtual experience engine and/or a virtual experience application) for the user's enjoyment. The user may interact with the scene as though the scene is occurring in real-time, even though the experience is a recreation. Other users may also be included in the recreated events, similar to if they were experiencing a concert or performance together in real time.

As described above, systems, methods, and computer-readable media may provide metaverse event sequencing and playback functionality. Variations of the above-described techniques may include additional features that produce improved user experiences and reduced latency in cueing scenes. Furthermore, technical effects including improved accuracy in scene recreation as well as reduced network bandwidth usage are also apparent.

Hereinafter, a more detailed description of various computing devices that may be used to implement different devices illustrated in FIGS. 1-3 and/or provide the user interface of FIG. 4, is provided with reference to FIG. 6.

Figure 6:
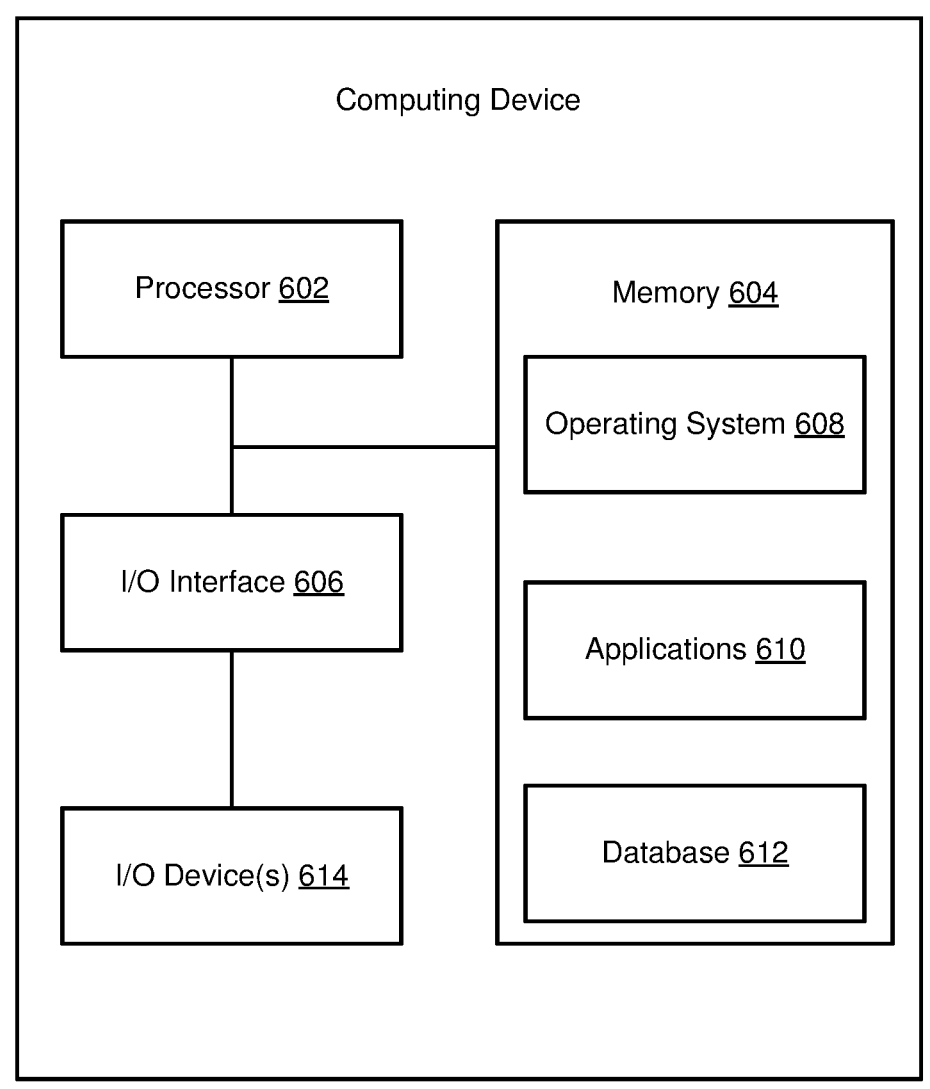
FIG. 6 is a block diagram illustrating an example computing device which may be used to implement one or more features described herein, in accordance with some implementations.

FIG. 6 is a block diagram of an example computing device 600 which may be used to implement one or more features described herein, in accordance with some implementations. In one example, device 600 may be used to implement a computer device, (e.g., 102, 110, and/or 116 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, headphones, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, applications 610 and associated data 612. In some implementations, the applications 610 can include instructions that enable processor 602 to perform the functions described herein, e.g., some or all of the methods of FIG. 5.

For example, memory 604 can include software instructions for metaverse event sequencing, cueing scenes in a metaverse place, or any of the functionality described herein. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online virtual experience platform 102 is described as performing operations as described in some implementations herein, any suitable component or combination of components of online virtual experience platform 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
receiving a request to cue a scene associated with a metaverse place from a user device, the scene associated with a master timeline of events that have occurred in the metaverse place from an origin point in time, wherein each event of the master timeline of events is associated with a respective time point on the master timeline, and wherein the request includes a first cue point;
retrieving scene data associated with the scene, wherein the scene comprises one or more virtual characters within the metaverse place and the scene data includes spatial telemetry associated with the one or more virtual characters;
identifying a set of events with time points that are at or after the first cue point;

transitioning the master timeline to the first cue point;
recreating the set of events in the metaverse place based upon a current point in the master timeline after the transitioning and in a sequence based on the master timeline, wherein the recreation of the set of events excludes playback of a video recording, and wherein the recreating comprises:
positioning the one or more virtual characters within the metaverse place based on the spatial telemetry associated with the one or more virtual characters, and
replaying a schema configuration of the scene, the replaying including applying cached initial properties of three-dimensional (3D) assets of the scene based on the master timeline of events; and
providing the recreated set of events for display at the user device.

2. The computer-implemented method of claim 1, wherein the master timeline of events comprises at least a sequence of events that have occurred in the metaverse place from the origin point in time.

3. The computer-implemented method of claim 2, wherein the scene further comprises one or more virtual items or objects within the metaverse place.

4. The computer-implemented method of claim 3, wherein the spatial telemetry is further associated with one or more of the virtual items or the objects.

5. The computer-implemented method of claim 1, wherein identifying the set of events comprises locating the first cue point on the master timeline of events, and identifying all events occurring at or after the first cue point from the master timeline of events.

6. The computer-implemented method of claim 1, wherein recreating the set of events comprises transmitting each event of the set of events, in the sequence, to a virtual experience application of the user device for recreation.

7. The computer-implemented method of claim 1, wherein recreating the set of events comprises transmitting each event of the set of events, in the sequence, to a virtual experience engine of a server for recreation.

8. The computer-implemented method of claim 1, wherein providing the recreated set of events for display at the user device comprises transmitting the recreated set of events, in the sequence, to a virtual experience application executing on the user device.

9. A system, comprising:
a memory with instructions stored thereon; and
a processing device, coupled to the memory, the processing device configured to access the memory, wherein the instructions when executed by the processing device, cause the processing device to perform operations including:
receiving a request to cue a scene associated with a metaverse place from a user device, the scene associated with a master timeline of events that have occurred in the metaverse place from an origin point in time, wherein each event of the master timeline of events is associated with a respective time point on the master timeline, and wherein the request includes a first cue point;
retrieving scene data associated with the scene, wherein the scene comprises one or more virtual characters within the metaverse place and the scene data includes spatial telemetry associated with the one or more virtual characters;
identifying a set of events with time points that are at or after the first cue point;

transitioning the master timeline to the first cue point;

recreating the set of events in the metaverse place based upon a current point in the master timeline after the transitioning and in a sequence based on the master timeline, wherein the recreation of the set of events excludes playback of a video recording, and wherein the recreating comprises:

positioning the one or more virtual characters within the metaverse place based on the spatial telemetry associated with the one or more virtual characters, and replaying a schema configuration of the scene, the replaying including applying cached initial properties of three-dimensional (3D) assets of the scene based on the master timeline of events; and providing the recreated set of events for display at the user device.

10. The system of claim 9, wherein the master timeline of events comprises at least a sequence of events that have occurred in the metaverse place from the origin point in time.

11. The system of claim 10, wherein the scene further comprises one or more virtual items or objects within the metaverse place.

12. The system of claim 11, wherein the spatial telemetry is further associated with one or more of the virtual items or the objects.

13. The system of claim 9, wherein identifying the set of events comprises locating the first cue point on the master timeline of events, and identifying all events occurring at or after the first cue point from the master timeline of events.

14. The system of claim 9, wherein recreating the set of events comprises transmitting each event of the set of events, in the sequence, to a virtual experience application of the user device for recreation.

15. The system of claim 9, wherein recreating the set of events comprises transmitting each event of the set of events, in the sequence, to a virtual experience engine of a server for recreation.

16. The system of claim 9, wherein providing the recreated set of events for display at the user device comprises transmitting the recreated set of events, in the sequence, to a virtual experience application executing on the user device.

17. A non-transitory computer-readable medium with instructions stored thereon that, responsive to execution by a processing device, cause the processing device to perform operations comprising:

receiving a request to cue a scene associated with a metaverse place from a user device, the scene associated with a master timeline of events that have occurred in the metaverse place from an origin point in time, wherein each event of the master timeline of events is associated with a respective time point on the master timeline, and wherein the request includes a first cue point;

retrieving scene data associated with the scene, wherein the scene comprises one or more virtual characters within the metaverse place and the scene data includes spatial telemetry associated with the one or more virtual characters;

identifying a set of events with time points that are at or after the first cue point;

transitioning the master timeline to the first cue point;

recreating the set of events in the metaverse place based upon a current point in the master timeline after the transitioning and in a sequence based on the master timeline, wherein the recreation of the set of events excludes playback of a video recording, and wherein the recreating comprises:

positioning the one or more virtual characters within the metaverse place based on the spatial telemetry associated with the one or more virtual characters, and replaying a schema configuration of the scene, the replaying including applying cached initial properties of three-dimensional (3D) assets of the scene based on the master timeline of events; and providing the recreated set of events for display at the user device.

18. The non-transitory computer-readable medium of claim 17, wherein the master timeline of events comprises at least a sequence of events that have occurred in the metaverse place from the origin point in time.

19. The non-transitory computer-readable medium of claim 18, wherein the scene further comprises one or more virtual items or objects within the metaverse place.

20. The non-transitory computer-readable medium of claim 19, wherein the spatial telemetry is further associated with one or more of the virtual items or the objects.

* * * * *